(12) United States Patent
Tawada et al.

(10) Patent No.: US 11,247,545 B2
(45) Date of Patent: Feb. 15, 2022

(54) WEATHER STRIP AND COUPLING STRUCTURE OF THE SAME

(71) Applicant: NISHIKAWA RUBBER CO., LTD., Hiroshima (JP)

(72) Inventors: Shingo Tawada, Hiroshima (JP); Hiroshi Hasegawa, Kanagawa-ken (JP)

(73) Assignee: NISHIKAWA RUBBER CO., LTD., Hiroshima (JP)

(*) Notice: Subject to any disclaimer, the term of this patent is extended or adjusted under 35 U.S.C. 154(b) by 7 days.

(21) Appl. No.: 16/771,211

(22) PCT Filed: Oct. 25, 2018

(86) PCT No.: PCT/JP2018/039706
§ 371 (c)(1),
(2) Date: Jun. 9, 2020

(87) PCT Pub. No.: WO2019/116747
PCT Pub. Date: Jun. 20, 2019

(65) Prior Publication Data
US 2020/0369137 A1 Nov. 26, 2020

(30) Foreign Application Priority Data
Dec. 12, 2017 (JP) .............................. JP2017-238165

(51) Int. Cl.
*E06B 7/16* (2006.01)
*B60J 10/246* (2016.01)
(Continued)

(52) U.S. Cl.
CPC .......... *B60J 10/246* (2016.02); *B60J 10/277* (2016.02); *B60J 10/33* (2016.02); *B60J 10/86* (2016.02)

(58) Field of Classification Search
CPC ........ B60J 10/246; B60J 10/277; B60J 10/33; B60J 10/86; B60J 10/88; B60J 10/24
(Continued)

(56) References Cited

U.S. PATENT DOCUMENTS

| 6,131,342 A | * | 10/2000 | Miyamoto | ............... B60J 10/24 |
| | | | | 49/484.1 |
| 10,654,349 B2 | * | 5/2020 | Matsuura | ................. B60J 10/24 |

(Continued)

FOREIGN PATENT DOCUMENTS

| JP | H1076847 A | 3/1998 |
| JP | H10226233 A | 8/1998 |

(Continued)

OTHER PUBLICATIONS

International Search Report (ISR) (and English translation thereof) dated Dec. 11, 2018 issued in International Application No. PCT/JP2018/039706.

(Continued)

*Primary Examiner* — Jerry E Redman
(74) *Attorney, Agent, or Firm* — Holtz, Holtz & Volek PC

(57) ABSTRACT

A coupling part of a weather strip is fixed between a first anchoring part and a second anchoring part on an outer peripheral part of a sash of a door. A hollow seal member and an outer lip are integrally formed with the coupling part and make elastic contact with a second surface and a first surface of a door opening edge of a body panel, respectively, when the door is in the closed position. The weather strip is fixed to the sash only by fixing the coupling part. A pillar part couples the coupling part with the hollow seal member. A body seal lip is provided on the hollow seal member and makes elastic contact with the door opening edge when the door is in the closed position.

8 Claims, 6 Drawing Sheets

(51) Int. Cl.
*B60J 10/277* (2016.01)
*B60J 10/33* (2016.01)
*B60J 10/86* (2016.01)

(58) Field of Classification Search
USPC .................................................. 49/495.1, 441
See application file for complete search history.

(56) References Cited

U.S. PATENT DOCUMENTS

| | | | | |
|---|---|---|---|---|
| 2002/0108313 | A1* | 8/2002 | Nozaki | B60J 10/16 |
| | | | | 49/441 |
| 2006/0000148 | A1* | 1/2006 | Mugishima | B60J 10/30 |
| | | | | 49/475.1 |
| 2006/0112660 | A1* | 6/2006 | Mugishima | B60J 10/30 |
| | | | | 52/716.7 |
| 2006/0137255 | A1* | 6/2006 | Nozaki | B60J 10/248 |
| | | | | 49/498.1 |
| 2007/0137112 | A1* | 6/2007 | Furuzawa | B60J 10/248 |
| | | | | 49/489.1 |
| 2007/0245635 | A1* | 10/2007 | Deguchi | B60J 10/30 |
| | | | | 49/498.1 |
| 2012/0023831 | A1* | 2/2012 | Matsumoto | B60J 10/30 |
| | | | | 49/489.1 |
| 2016/0214468 | A1* | 7/2016 | Endo | B60R 13/04 |
| 2017/0225554 | A1* | 8/2017 | Matsuwaki | B60J 10/80 |
| 2017/0355253 | A1* | 12/2017 | Ogawa | E06B 7/2309 |
| 2018/0298678 | A1* | 10/2018 | Amagai | E06B 7/2309 |
| 2019/0047391 | A1* | 2/2019 | Kamitani | B60J 10/86 |
| 2020/0369137 | A1* | 11/2020 | Tawada | B60J 10/86 |

FOREIGN PATENT DOCUMENTS

| | | |
|---|---|---|
| JP | 2010076466 A | 4/2010 |
| JP | 2010208514 A | 9/2010 |
| JP | 5715780 B2 | 3/2015 |
| JP | 2015107704 A | 6/2015 |

OTHER PUBLICATIONS

Written Opinion dated Dec. 11, 2018 issued in International Application PCT/JP2018/039706.

* cited by examiner

WEATHER STRIP AND COUPLING STRUCTURE OF THE SAME

TECHNICAL FIELD

The present invention relates to a weather strip and a coupling structure of the weather strip. The weather strip couples to a sash of a door of an automobile. The weather strip makes elastic contact with a door opening edge of a body panel of the automobile to seal a space between the body panel and the sash of the door.

BACKGROUND ART

A weather strip 50 couples to a peripheral edge of a side door 1 of an automobile as illustrated in FIG. 6. The weather strip 50 makes elastic contact with a body 3 when the side door 1 is in a closed position to seal a space between the side door 1 and the body 3.

The weather strip 50 includes a coupling part 51, a hollow seal member 52, an outer lip 53, and a pillar part 54 as illustrated in FIG. 7. The coupling part 51 couples to a sash 2 of the side door 1 of the automobile. The hollow seal member 52 and the outer lip 53 are integrally formed with an inner-cabin side and an outer-cabin side of the coupling part 51, respectively. The hollow seal member 52 and the outer lip 53 make elastic contact with an inner-cabin side and an outer-cabin side of a door opening edge of a body panel 3 when the side door 1 is in the closed position. The pillar part 54 couples the coupling part 51 with the hollow seal member 52 (see, for example, FIG. 1(a) of Patent document 1).

The coupling part 51 of the weather strip 50 is fixed between a first anchoring part 5X close to an exterior of the automobile and a second anchoring part 5Y close to an interior of the automobile. The first anchoring part 5X and the second anchoring part 5Y are provided on an outer periphery of an outer peripheral part 2A of the sash 2 of the side door 1. The weather strip 50 is fixed to the sash 2 only by fixing the coupling part 51. The hollow seal member 52 is not fixed to the sash 2 directly.

A glass run 20 couples to an inner peripheral part 2B of the sash 2. The glass run 20 includes an installation base member 21, a first lip 22 close to the exterior of the automobile, and a second lip 23 close to the interior of the automobile. The installation base member 21 has a substantially U-shaped cross section. The first lip 22 and the second 23 are integrally formed with both ends of the installation base member 21, and slidably brought into contact with an outer-cabin side and an inner-cabin side of a door glass 4 that lifts and lowers.

The pillar part 54 of the weather strip 50 couples the coupling part 51 with the hollow seal member 52. Accordingly, when the hollow seal member 52 laps on the sash 2 or a garnish 7 on the sash 2 with the weather strip 50 coupling to the sash 2, the hollow seal member 52 as a whole rotates toward the exterior of the automobile around a linking part, and the hollow seal member 52 is maintained in shape. The linking part is where the pillar part 54 is linked to the coupling part 51. With this configuration, the rotation does not cause partial deformation of the hollow seal member 52 including partial shrinkage and extension of the hollow seal member 52. In other words, the rotation does not degrade sealing function of the hollow seal member 52.

RELATED ART DOCUMENTS

Patent Documents

Patent document 1: Japanese Patent No. 5715780

DISCLOSURE OF THE INVENTION

Problems to be Solved by the Invention

When high pressure water splashes the weather strip 50 from the exterior of the automobile while washing the automobile or the like, the outer lip 53 dams up water. In case a large amount of water collects on the outer lip 53, part of water may pass through a space between the body panel 3 and the outer lip 53, and infiltrate into the interior of the automobile through a space between the body panel 3 and the hollow seal member 52.

Therefore, an object of the present invention is to provide the weather strip improved in sealing function and to provide the coupling structure of the weather strip.

Means of Solving the Problems

In order to achieve the above-mentioned object, according to a first aspect of the invention, a weather strip (30) is provided. The weather strip (30) includes a coupling part (31), a hollow seal member (32), an outer lip (33), a pillar part (34), and a body seal lip (35). The coupling part (31) is fixed between a first anchoring part (15X) close to an exterior of an automobile and a second anchoring part (15Y) close to an interior of the automobile. The first anchoring part (15X) and the second anchoring part (15Y) are provided on an outer periphery of an outer peripheral part (2A) of a sash (2) of a door (1) of the automobile. The hollow seal member (32) and the outer lip (33) are integrally formed with an inner-cabin side and an outer-cabin side of the coupling part (31), respectively. The hollow seal member (32) and the outer lip (33) make elastic contact with a second surface (3a) of a door opening edge of a body panel (3) close to the interior of the automobile and a first surface (3b) of the door opening edge of the body panel (3) close to the exterior of the automobile, respectively, when the door (1) is in the closed position. The weather strip (30) is fixed to the sash (2) only by fixing the coupling part (31). The hollow seal member (32) is not fixed to the sash (2) directly. The pillar part (34) couples the coupling part (31) with the hollow seal member (32). The body seal lip (35) is provided on the hollow seal member (32). The body seal lip (35) makes elastic contact with the door opening edge of the body panel (3) when the door (1) is in the closed position.

In addition, according to a second aspect of the invention, a concave part is provided as a channel (38) recessed into an inner side from an outer-cabin side of a base root of the body seal lip (35), such that the concave part is thinner than at least one other part of the base root of the body seal lip (35).

In addition, according to a third aspect of the present invention, an installation surface seal lip (36) is provided on a lower surface of a bottom wall (32A) of the hollow seal member (32). The installation surface seal lip (36) makes elastic contact with the sash (2) of the door (1).

In addition, according to a fourth aspect of the present invention, a cover lip (37) is provided on an outer-cabin side of the coupling part (31). The cover lip (37) is closer to the interior of the automobile than the first anchoring part (15X) close to the exterior of the automobile. The cover lip (37)

makes elastic contact with the first anchoring part (15X) and covers the first anchoring part (15X).

In addition, according to a fifth aspect of the present invention, the hollow seal member (32) includes the bottom wall (32A), a vertical wall (32B), and a seal wall (32C). The bottom wall (32A) is substantially parallel with a surface (2C) of the sash (2) of the door (1) close to the interior of the automobile. The vertical wall (32B) extends in a direction substantially perpendicular to an inner-cabin and outer-cabin direction from a first end of the bottom wall (32A) close to the exterior of the automobile. The seal wall (32C) connects with an end of the vertical wall (32B) and a second end of the bottom wall (32A) close to the interior of the automobile. The seal wall (32C) is curved outwardly. The seal wall (32C) is formed to bend toward the interior of the automobile relative to the vertical wall (32B). The body seal lip (35) extends outwardly toward the exterior of the automobile from a part of the hollow seal member (32) closer to the seal wall (32C) than a connecting part at which the seal wall (32C) is connected to the vertical wall (32B).

In addition, according to a sixth aspect of the present invention, a coupling structure is provided of the weather strip (30) according to any one of the first to fifth aspects of the invention to a sash (2) of a door (1). The coupling structure includes a second surface (3a) of a door opening edge of a body panel (3) close to an interior of an automobile, a first surface (3b) of the door opening edge of the body panel (3) close to an exterior of the automobile, and an oblique surface (3c). A hollow seal member (32) and an outer lip (33) make elastic contact with the second surface (3a) and the first surface (3b), respectively, when the door (1) is in the closed position. The oblique surface (3c) connects with the second surface (3a) and the first surface (3b). The oblique surface (3c) extends downwards toward the interior of the automobile such that the second surface (3a) and the first surface (3b) are formed on an uneven base. A top end (35a) of the body seal lip (35) comes into contact with the oblique surface (3c) first as the door (1) approaches the closed position.

In addition, according to a seventh aspect of the invention, the second surface (3a) of the door opening edge of the body panel (3) close to the interior of the automobile is substantially parallel with the surface (2C) of the sash (2) close to the interior of the automobile when the door (1) is in the closed position. The hollow seal member (32) makes elastic contact with a connecting part (P) at which the second surface (3a) is connected to the oblique surface (3c) as well as the second surface (3a) when the door (1) is in the closed position.

Symbols in parentheses show constituents or items corresponding to the drawings.

According to the present invention, the body seal lip is provided on the hollow seal member and makes elastic contact with the door opening edge of the body panel when the door is in the closed position. In case the outer lip does not dam up high pressure water sufficiently while washing the automobile or the like and high pressure water passes through a space between the body panel and the outer lip, the body seal lip dams up high pressure water. With this configuration, infiltration of water into the interior of the automobile is prevented.

In addition, the concave part is provided as the channel recessed into the inner side from the outer-cabin side of the base root of the body seal lip. With this configuration, the body seal lip is easy to bend, and increase in compression load on the body seal lip is prevented from the hollow seal member when the hollow seal member makes elastic contact with the body panel. Also, with the configuration that the concave part is provided as the channel recessed into the inner side from the outer-cabin side of the base root of the body seal lip, the top end of the body seal lip is subjected to force and is pulled toward the interior of the automobile by the force when in elastic contact with the body panel, such that sealing property is improved.

In addition, the installation surface seal lip is provided on the lower surface of the bottom wall of the hollow seal member and makes elastic contact with the sash of the door. In case high pressure water passes through a space between a bottom part (lower part) of the coupling part and the sash of the door along the first anchoring part close to the exterior of the automobile, the installation surface seal lip dams up high pressure water. With this configuration, infiltration of water into the interior of the automobile is prevented. In addition, with the configuration that the hollow seal member makes elastic contact with the body panel, reaction force relative the installation surface seal lip increases, and the installation surface seal lip is improved in damming up water.

In addition, the cover lip is provided on the outer-cabin side of the coupling part. The cover lip is closer to the interior of the automobile than the first anchoring part close to the exterior of the automobile, makes elastic contact with the first anchoring part, and covers the first anchoring part. With this configuration, the cover lip prevents water from passing through the space between the bottom part (lower part) of the coupling part and the sash of the door along the first anchoring part.

In addition, the hollow seal member includes the bottom wall, the vertical wall, and the seal wall. The seal wall is between the vertical wall and the bottom wall and formed to bend toward the interior of the automobile relative to the vertical wall. Also, the body seal lip extends outwardly toward the exterior of the automobile from the part of the hollow seal member closer to the seal wall than the connecting part at which the seal wall is connected to the vertical wall. With this configuration, the body seal lip is controlled to bend in a fixed direction relative to the body panel when the door is in the closed position and stably seals a space between the body panel and the sash of the door.

In addition, the second surface of the door opening edge of the body panel close to the interior of the automobile and the first surface of the door opening edge of the body panel close to the exterior of the automobile are formed on the uneven base. Also, the oblique surface which extends downwards toward the interior of the automobile connects with the second surface and the first surface. As the door approaches the closed position, the top end of the body seal lip comes into contact with the oblique surface first, slides and moves toward the first surface, and an upper surface of the top end of the body seal lip makes elastic contact with the first surface. With this configuration, the body seal lip is in close adherence with the body panel and performs an excellent sealing function.

In addition, the second surface of the door opening edge of the body panel close to the interior of the automobile is substantially parallel with the surface of the sash close to the interior of the automobile when the door is in the closed position. The hollow seal member makes elastic contact with the connecting part at which the second surface is connected to the oblique surface as well as the second surface when the door is in the closed position. With this configuration, the hollow seal member fits into a space between the surface of the sash close to the interior of the automobile and the second surface, and stably seals the space.

MODE FOR CARRYING OUT THE INVENTION

Figure 1:
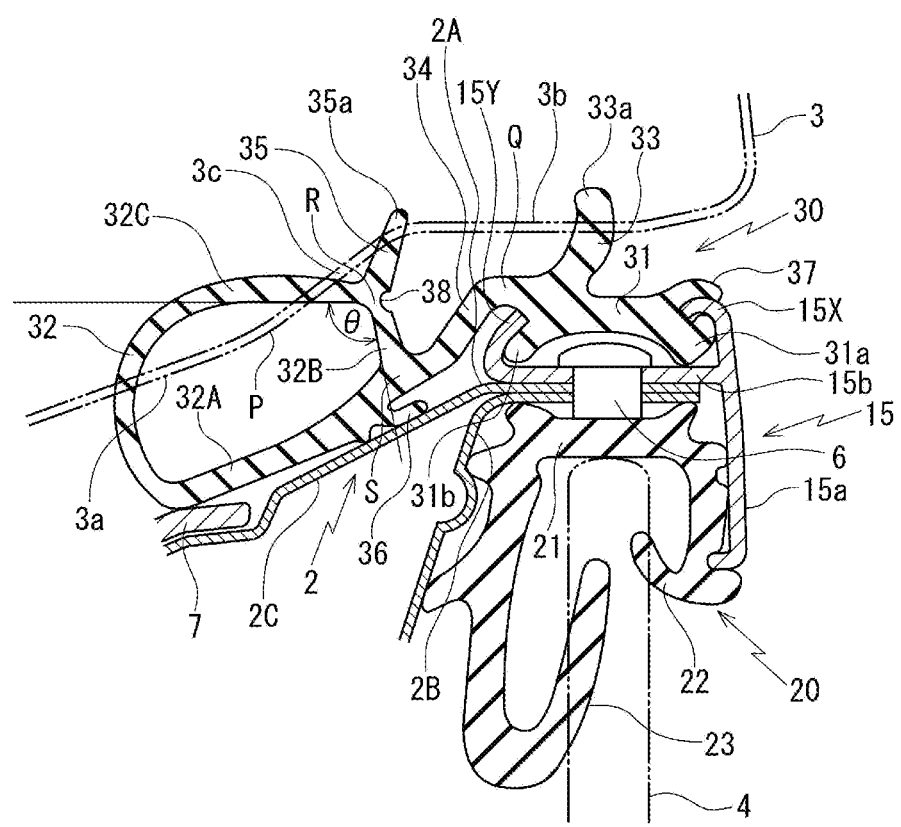
FIG. 1 is an enlarged cross-sectional view of a coupling structure according to an embodiment of the invention of a weather strip taken along line I-I of FIG. 6.
Figure 2:
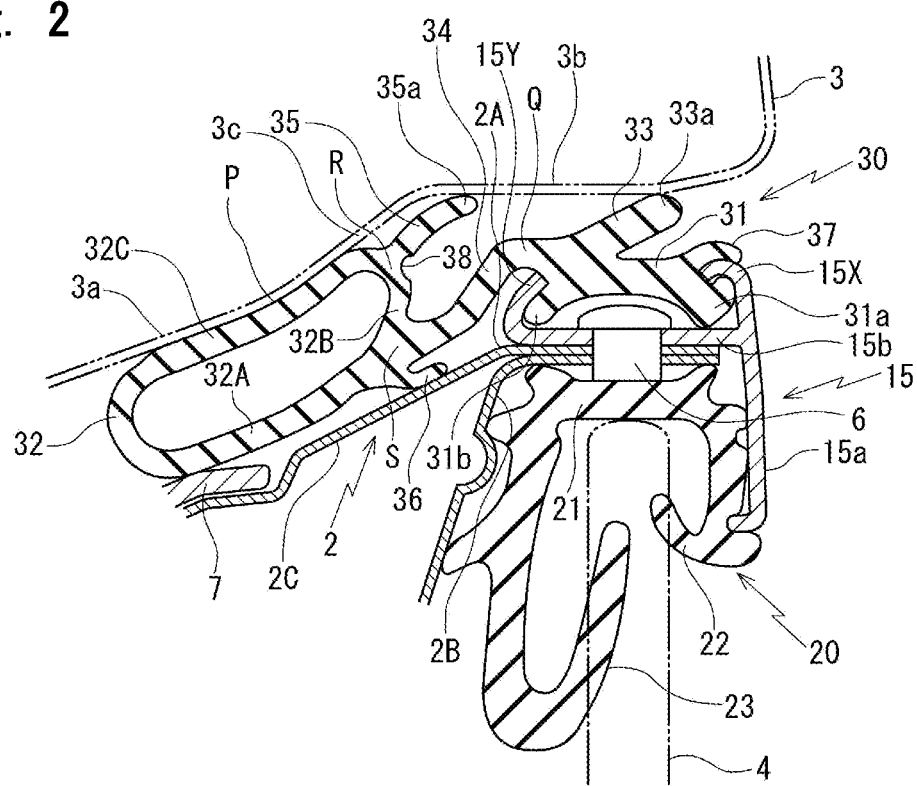
FIG. 2 is the enlarged cross-sectional view of the coupling structure according to the embodiment of the invention of the weather strip taken along line I-I of FIG. 6 with the weather strip of FIG. 1 in elastic contact with a body panel.
Figure 6:
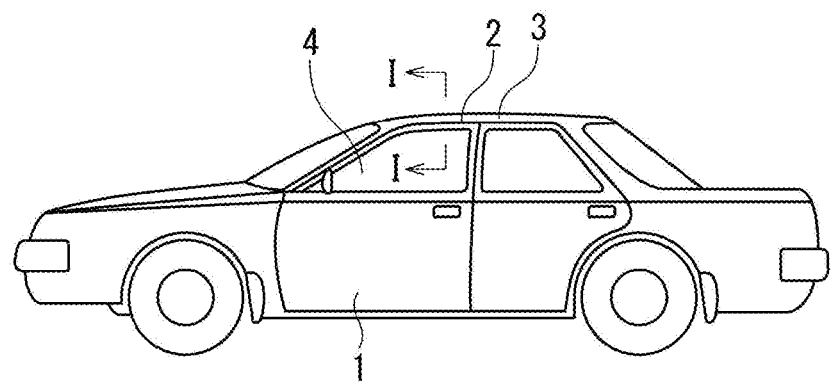
FIG. 6 is a side view of an automobile.
Figure 7:
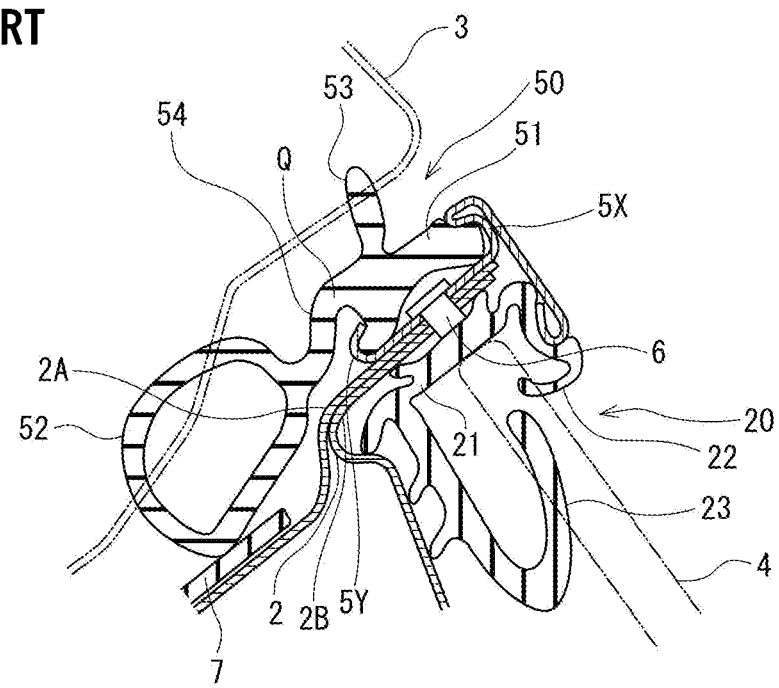
FIG. 7 is an enlarged cross-sectional view of a coupling structure according to a prior art of a weather strip taken along line I-I of FIG. 6.

Referring to FIG. 1 and FIG. 2, a weather strip 30 and a coupling structure according to an embodiment of the present invention of the weather strip 30 will be described. FIG. 1 is an enlarged cross-sectional view of a coupling structure according to a first embodiment of the invention of the weather strip 30 taken along line I-I of FIG. 6 with the weather strip 30 out of elastic contact with a body panel 3. FIG. 2 is the cross-sectional view of the coupling structure with the weather strip 30 of FIG. 1 in elastic contact with the body panel 3 and bent. When constituents or items correspond to those in prior arts, the same symbols are used.

As illustrated in FIG. 1, the weather strip 30 according to the embodiment of the present invention includes a coupling part 31, a hollow seal member 32, an outer lip 33, a pillar part 34, and a body seal lip 35. The coupling part 31 is fixed to an outer periphery of an outer peripheral part 2A of a sash 2 of a door 1 of an automobile. The hollow seal member 32 and the outer lip 33 are integrally formed with an inner-cabin side and an outer-cabin side of the coupling part 31, respectively. The hollow seal member 32 and the outer lip 33 make elastic contact with a second surface 3a of a door opening edge of a body panel 3 close to an interior of the automobile and a first surface 3b of the door opening edge of the body panel 3 close to an exterior of the automobile, respectively, when the door 1 is in a closed position to seal a space between the body panel 3 and the sash 2.

The pillar part 34 couples the coupling part 31 with the hollow seal member 32. The weather strip 30 is fixed to the sash 2 only by fixing the coupling part 31. The hollow seal member 32 is not fixed to the sash 2 directly.

A glass run 20 couples to an inner peripheral part 2B of the sash 2. The glass run 20 includes an installation base member 21, a first lip 22 close to the exterior of the automobile, and a second lip 23 close to the interior of the automobile. The installation base member 21 has a substantially U-shaped cross section. The first lip 22 and the second lip 23 are integrally formed with both ends of the installation base member 21 and are slidably brought into contact with an outer-cabin side and an inner-cabin side of a door glass 4 that lifts and lowers.

The coupling part 31 of the weather strip 30 is fixed between a first anchoring part 15X close to an exterior of an automobile and a second anchoring part 15Y close to an interior of the automobile. Specifically, the coupling part 31 includes a first protruding edge 31a close to the exterior of the automobile and a second protruding edge 31b close to the interior of the automobile. The first protruding edge 31a and the second protruding edge 31b are formed on an outer-cabin side and an inner-cabin side of a bottom part (close to the sash 2) of the coupling part 31, respectively, and are fit into the first anchoring part 15X and the second anchoring part 15Y, respectively. The first anchoring part 15X and the second anchoring part 15Y are provided on an outer periphery of an outer peripheral part 2A of the sash 2, and are provided as curved parts which have a concave-shaped cross section. The first anchoring part 15X and the second anchoring part 15Y are open toward the interior of the automobile and the exterior of the automobile, respectively.

In addition, a cover lip 37 is provided on the outer-cabin side of an upper part (close to the body panel 3) of the coupling part 31. The cover lip 37 is closer to the interior of the automobile than the first anchoring part 15X close to the exterior of the automobile, makes elastic contact with the first anchoring part 15X, and covers the first anchoring part 15X. With this configuration, the coupling part 31 of the weather strip 30, once fixed between the first anchoring part 15X and the second anchoring part 15Y, is hard to come off.

The first anchoring part 15X close to the exterior of the automobile and the second anchoring part 15Y close to the interior of the automobile may be formed by folding a singular sheet metal using a roll forming process. In the present embodiment, the first anchoring part 15X and the second anchoring part 15Y are formed by aluminum die-casting and are formed on an outer-cabin side and the inner-cabin side of a retainer 15b of a molding member 15, respectively. The molding member 15 has a substantially T-shaped cross section including a molding part 15a and the retainer 15b. The molding part 15a is exposed toward the exterior of the automobile to decorate the sash 2. The retainer 15b extends toward the interior of the automobile. The molding member 15 is fixed to the sash 2 by a rivet 6. The molding member 15 is so called "luminous molding", that is the molding part 15a is colored silver and mirror-surface finished. The "luminous molding" gives sense of luxuriousness to the automobile by shining the automobile in silver color.

The hollow seal member 32 of the weather strip 30 is seamless and annular in cross section. The hollow seal member 32 includes a bottom wall 32A, a vertical wall 32B, and a seal wall 32C. The bottom wall 32A is substantially parallel with a surface 2C of the sash 2 of the door 1 close to the interior of the automobile. The vertical wall 32B extends in a direction substantially perpendicular to an inner-cabin and outer-cabin direction from a first end of the bottom wall 32A close to the exterior of the automobile. The seal wall 32C connects with an end of the vertical wall 32B and a second end of the bottom wall 32A close to the interior of the automobile. The seal wall 32C is curved outwardly. The seal wall 32C is crooked toward the interior of the automobile relative to the vertical wall 32B.

A first end of the seal wall 32C close to the vertical wall 32B is increased in thickness compared with a second end of the seal wall 32C close to the bottom wall 32A. An inner surface of the seal wall 32C (close to the sash 2) is set at an angle θ to an inner-cabin side surface of the vertical wall 32B. The angle θ is an obtuse angle. In the present embodiment, the angle θ is substantially 100 degrees, but this should not be construed in a limiting sense.

The hollow seal member 32 is designed to touch an outer surface of a garnish 7 on an inner-cabin side of the sash 2 once the weather strip 30 is fixed to the sash 2 such that a space is not left between the hollow seal member 32 and the garnish 7.

An outer lip 33 of the weather strip 30 has a substantially tongue-shaped cross section, and is between the first protruding edge 31a close to the exterior of the automobile and the second protruding edge 31b close to the interior of the automobile. A base root of the outer lip 33 is closer to the second protruding edge 31b and is integrally formed with an outer periphery of the coupling part 31. The outer lip 33 extends to rise from the coupling part 31 toward the body panel 3 when the door 1 is in the closed position. The body panel 3 faces the coupling part 31 when the door 1 is in the closed position.

The pillar part 34 couples the coupling part 31 with the hollow seal member 32. A first end of the pillar part 34 close to the coupling part 31 couples with an inner-cabin side of the upper part (close to the body panel 3) of the coupling part 31. A second end of the pillar part 34 close to the hollow seal member 32 couples with a connecting part at which the bottom wall 32A is connected to the vertical wall 32B. The pillar part 34 is longer in cross section than the vertical wall 32B and shorter in cross section than the bottom wall 32A. In the present embodiment, the pillar part 34 has substantially the same length in cross section as width (in the inner-cabin and outer-cabin direction) of the coupling part 31.

A body seal lip 35 is provided on the hollow seal member 32. The body seal lip 35 makes elastic contact with the door opening edge of the body panel 3 when the door 1 is in the closed position.

The body seal lip 35 is tapered and extends diagonally toward the exterior of the automobile from a part of the hollow seal member 32 closer to the seal wall 32C than a connecting part R. The connecting part R is where the seal wall 32C is connected to the vertical wall 32B. In the present embodiment, the body seal lip 35 extends in parallel with the outer lip 33 when the body seal lip 35 and the outer lip 33 are out of elastic contact with the body panel 3.

A concave part is provided as a channel 38 on an outer-cabin side of a base root of the body seal lip 35. The channel 38 is recessed into the inner side from the outer-cabin side of the base root of the body seal lip 35, such that the concave part is thinner than at least one other part of the base root of the body seal lip 35. With this configuration, the body seal lip 35 is easy to bend when in elastic contact with the door opening edge, and increase in load on the body seal lip 35 is prevented when the hollow seal member 32 is in elastic contact with the body panel 3.

An installation surface seal lip 36 is provided on a lower surface of the bottom wall 32A of the hollow seal member 32. The installation surface seal lip 36 makes elastic contact with the sash 2 of the door 1. The installation surface seal lip 36 extends outwardly toward the exterior of the automobile from a part of the hollow seal member 32 closer to the interior of the automobile than a connecting part S. The connecting part S is where the bottom wall 32A is connected to the vertical wall 32B.

With this configuration, in case water enters a space between the coupling part 31 and the first anchoring part 15X close to the exterior of the automobile or the second anchoring part 15Y close to the interior of the automobile, the installation surface seal lip 36 prevents further infiltration of water into the interior of the automobile from a space between the hollow seal member 32 and the sash 2.

The sash 2 of the door 1 may be formed by folding a singular sheet metal using a roll forming process. In the present embodiment, the sash 2 is formed by joining two sheets of metal as an inner panel and an outer panel together into a shape of a flange. The surface 2C of the sash 2 close to the interior of the automobile is an oblique surface and extends downwards toward the interior of the automobile from the part joined into the shape of the flange. A part of the sash 2 on the inner-cabin side of the surface 2C is folded downward to form a channel such that the garnish 7 is disposed on the channel.

The second surface 3a of the door opening edge of the body panel 3 close to the interior of the automobile is below the first surface 3b of the door opening edge of the body panel 3 close to the exterior of the automobile. The oblique surface 3c connects with the second surface 3a and the first surface 3b. The oblique surface 3c extends downwards toward the interior of the automobile such that the second surface 3a and the first surface 3b are formed on an uneven base in an upper and lower direction. The first surface 3b extends in a substantially inner-cabin and outer-cabin direction. The second surface 3a is a slope and extends downwards toward the interior of the automobile. The second surface 3a is inclined at a smaller degree angle than the oblique surface 3c, which connects with the second surface 3a and the first surface 3b.

The second surface 3a is substantially parallel with the surface 2C of the sash 2 when the door 1 is in the closed position.

When the door 1 approaches the closed position from an opened position, as illustrated in FIG. 2, the hollow seal member 32 of the weather strip 30 makes elastic contact with the second surface 3a and the oblique surface 3c of the door opening edge of the body panel 3, and the outer lip 33 of the weather strip 30 makes elastic contact with the first surface 3b of the door opening edge of the body panel 3. The second surface 3a is close to the interior of the automobile and the first surface 3b is close to the exterior of the automobile. A top end 35a of the body seal lip 35 on the hollow seal member 32 comes into contact with the oblique surface 3c first, which connects with the second surface 3a and the first surface 3b. Then, the top end of the 35a of the body seal lip 35 as well as the hollow seal member 32 bend, and the top end 35a slides and moves toward the first surface 3b from the oblique surface 3c. Finally, an inner-cabin side surface of the top end 35a makes elastic contact with the first surface 3b. In the same manner, an inner-cabin side surface of a top end 33a of the outer lip 33 makes elastic contact with the first surface 3b, and then slides and moves toward the exterior of the automobile. As a result, as the hollow seal member 32 makes elastic contact with the second surface 3a and the oblique surface 3c, the installation surface seal lip 36, provided on a lower surface of the bottom wall 32A of the hollow seal member 32, is strongly pressed against the surface 2C of the sash 2.

The weather strip 30 and the coupling structure according to the embodiment of the present invention of the weather strip 30 includes the body seal lip 35. The body seal lip 35 is provided on the hollow seal member 32 and makes elastic contact with the door opening edge of the body panel 3 when the door 1 is in the closed position. With this configuration, sealing function of the weather strip 30 is improved.

Figure 3:
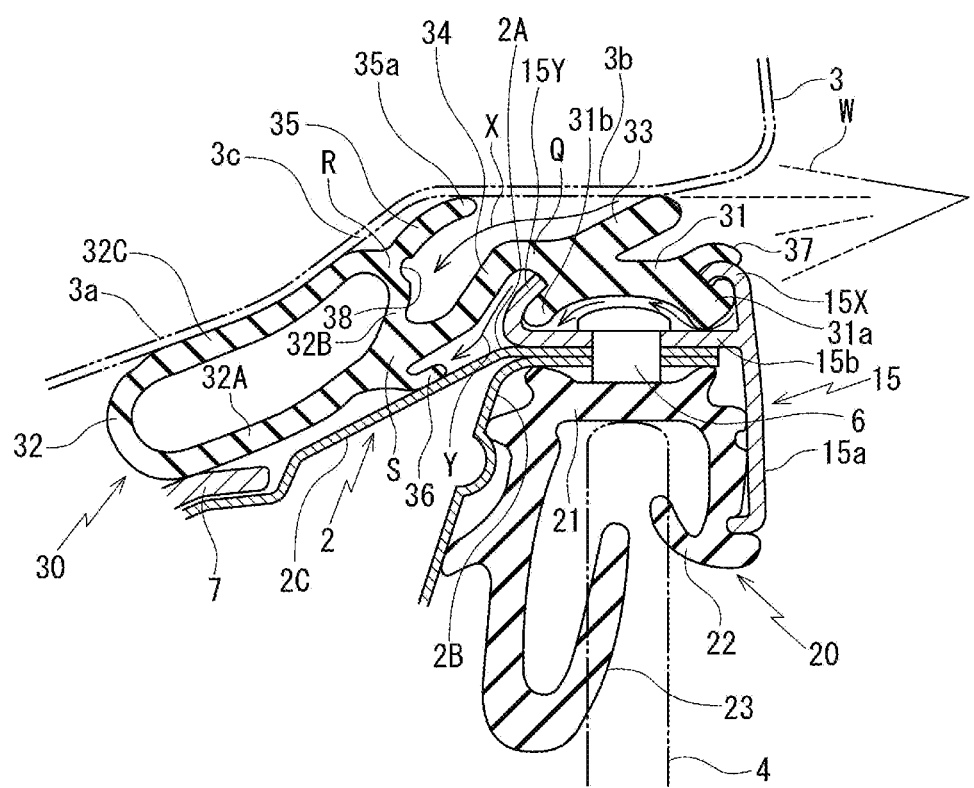
FIG. 3 is the enlarged cross-sectional view of the coupling structure according to the embodiment of the invention of the weather strip taken along line I-I of FIG. 6 with high pressure water splashing the weather strip of FIG. 1, the weather strip of FIG. 1 being in elastic contact with the body panel.

More specifically, in case the outer lip 33 does not dam up high pressure water W sufficiently while washing the automobile or the like with the weather strip 30 in elastic contact with the body panel 3 as illustrated in FIG. 3, part of high pressure water W passes through a space between the body panel 3 and the outer lip 33. High pressure water W splashes the weather strip 30 from the exterior of the automobile. However, the body seal lip 35 according to the embodiment of the present invention dams up the part of high pressure water W, which passes through the space between the body panel 3 and the outer lip 33. As a result, the part of high pressure water W collects in a space between the hollow seal member 32 and an upper surface of the pillar part 34 as illustrated by an arrow X, is guided in a longitudinal direction of the weather strip 30, and drained outside.

In addition, the body seal lip 35 extends toward the exterior of the automobile from the part of the hollow seal member 32 closer to the seal wall 32C than the connecting part R, at which the seal wall 32C is connected to the vertical wall 32B. With this configuration, the body seal lip 35 is controlled to bend in a direction which fortifies an elastic contact force of the body seal lip 35 with the first surface 3b. Accordingly, sealing function of the body seal lip 35 is improved.

In addition, the concave part is provided as the channel 38 recessed into the inner side from the outer-cabin side of the base root of the body seal lip 35. With this configuration, the body seal lip 35 is easy to bend, and increase in compression load is prevented on the body seal lip 35 from the hollow seal member 32 when the hollow seal member 32 makes elastic contact with the body panel 3. Also, with the configuration that the concave part is provided as the channel 38 recessed into the inner side from the outer-cabin side of the base root of the body seal lip 35, the top end 35a of the body seal lip 35 is subjected to force and is pulled toward the interior of the automobile by the force when in elastic contact with the body panel 3, such that sealing property is improved.

In addition, the cover lip 37 is provided on the outer-cabin side of the coupling part 31. The cover lip 37 is closer to the interior of the automobile than the first anchoring part 15X close to the exterior of the automobile, makes elastic contact with the first anchoring part 15X, and covers the first anchoring part 15X. With this configuration, the cover lip 37 prevents high pressure water W from passing through the space between the bottom part (lower part) of the coupling part 31 and the sash 2 of the door 1 along the first anchoring part 15X.

In case the part of high pressure water W passes through the space between the bottom part (lower part) of the coupling part 31 and the sash 2 of the door 1 along the first anchoring part 15X close to the exterior of the automobile, the installation surface seal lip 36 dams up high pressure water W. The installation surface seal lip 36 is provided on the lower surface of the bottom wall 32A of the hollow seal member 32 and makes elastic contact with the sash 2 of the door 1. High pressure water W collects in a space between the sash 2 of the door 1 and a lower surface of the pillar part 34 as illustrated by an arrow Y, is guided in the longitudinal direction of the weather strip 30, and drained outside. In addition, as the hollow seal member 32 makes elastic contact with the body panel 3, reaction force relative to the installation surface seal lip 36 increases. With this configuration, the installation surface seal lip 36 is improved in damming up high pressure water W.

In addition, the second surface 3a of the door opening edge of the body panel 3 close to the interior of the automobile and the first surface 3b of the door opening edge of the body panel 3 close to the exterior of the automobile are formed on the uneven base. Also, the oblique surface 3c, which extends downwards toward the interior of the automobile, connects with the second surface 3a and the first surface 3b. As the door 1 approaches the closed position, the top end 35a of the body seal lip 35 comes into contact with the oblique surface 3c first, slides and moves toward the first surface 3b, and the inner-cabin side surface of the top end 35a of the body seal lip 35 makes elastic contact with the first surface 3b. With this configuration, the body seal lip 35 is in close adherence with the body panel 3 and performs an excellent sealing function.

In addition, the second surface 3a of the door opening edge of the body panel 3 close to the interior of the automobile is substantially parallel with the surface 2C of the sash 2 close to the interior of the automobile when the door 1 is in the closed position. When the door 1 is in the closed position, the hollow seal member 32 makes elastic contact with a connecting part P as well as the second surface 3a. The connecting part P is where the second surface 3a is connected to the oblique surface 3c. With this configuration, the hollow seal member 32 fits into a space between the surface of the sash 2 close to the interior of the automobile and the door opening edge of the body panel 3, and stably seals the space.

The pillar part 34 supports the hollow seal member 32 as a whole. Accordingly, when the hollow seal member 32 laps on the garnish 7 on the sash 2 with the weather strip 30 coupling to the sash 2, the hollow seal member 32 as the whole rotates toward the exterior of the automobile (clockwise direction in FIG. 1) around a linking part Q, and the hollow seal member 32 is maintained in shape. The linking part Q is where the pillar part 34 is linked to the coupling part 31. With this configuration, the rotation does not cause partial deformation of the hollow seal member 32 including partial shrinkage and extension. In other words, the rotation does not degrade sealing function of the hollow seal member 32 to fill up the space between the sash 2 and the body panel 3 by making elastic contact with the body panel 3 when the door 1 is in the closed position.

In case high pressure water W is jetted toward the interior of the automobile from a position close to the first anchoring part 15X on the molding member 15 with the weather strip 30 according to the embodiment of the present invention coupling to the sash 2 as illustrated in FIG. 3, water W does not drop down over the hollow seal member 32 or infiltrate into the interior of the automobile.

In the present embodiment, the hollow seal member 32, the body seal lip 35, the pillar part 34, and the coupling part 31 are formed by the same material. Examples of material preferable to use include EPDM rubber sponge material of synthetic rubber and a foamed body or a non-foamed body low in rigidity of thermoplastic elastomer (TPE), but are not specifically limited as long as the material is a rubber-like elastic body.

A part of the coupling part 31 may include material higher in rigidity to improve efficiency in coupling operation.

Figure 4:
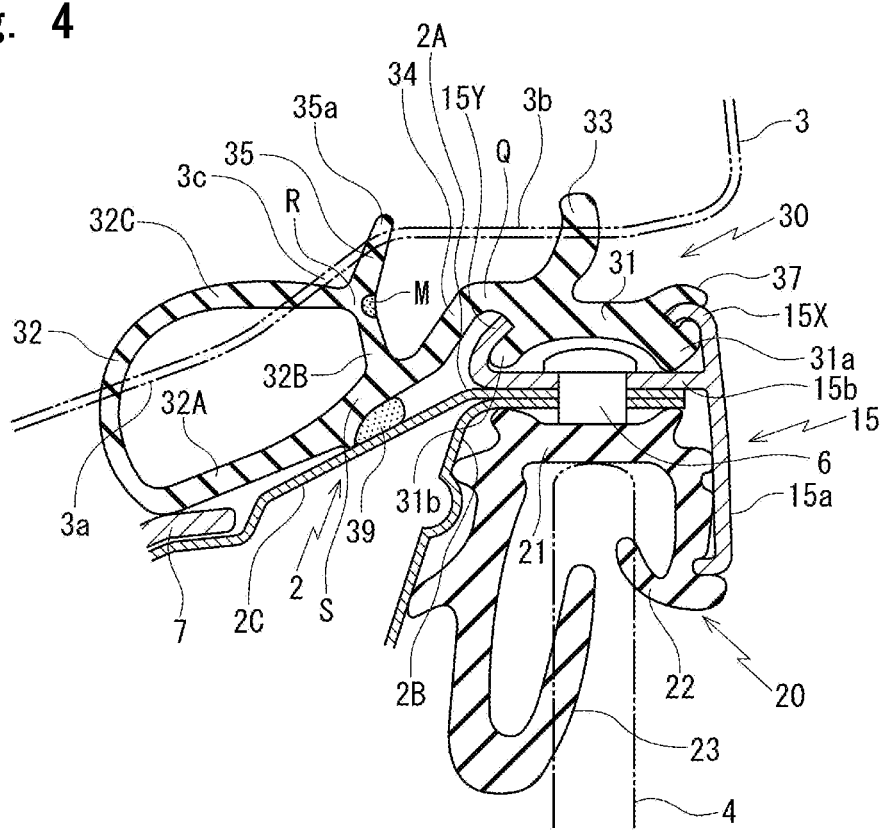
FIG. 4 is the enlarged cross-sectional view of the coupling structure according to another embodiment of the invention of the weather strip taken along line I-I of FIG. 6.

In the present embodiment, the body seal lip 35 extends toward the body panel 3 from the hollow seal member 32, and the concave part is provided as the channel 38 recessed into the inner side from the outer-cabin side of the base root of the body seal lip 35 such that the body seal lip 35 is easy to bend. But this should not be construed in a limiting sense. Another possible embodiment is, as illustrated in FIG. 4, material M is provided on the outer-cabin side of the base root of the body seal lip 35. The material M is lower in rigidity than at least one other part of the base root of the body seal lip 35. Still another possible embodiment is that the concave part is not provided as the channel 38 recessed into the inner side from the outer-cabin side of the base root of the body seal lip 35, or the material M is not provided to the outer-cabin side of the base root of the body seal lip 3. With this configuration, reaction force increases to some extent relative to the body seal lip 35 when the hollow seal member 32 makes elastic contact with the body panel 3, but the body seal lip 35 dams up high pressure water W and prevents infiltration of water W into the interior of the automobile.

While in the present embodiment the installation surface seal lip 36 extends toward the sash 2 of the door 1 from the bottom of the hollow seal member 32, this should not be construed in a limiting sense. Another possible embodiment is, as illustrated in FIG. 4, highly foamed sponge material 39 substitutes for the installation surface seal lip 36.

In the present embodiment, the hollow seal member 32 includes the bottom wall 32A, the vertical wall 32B, and the seal wall 32C, which is between the bottom wall 32A and the vertical wall 32B and crooked toward the interior of the automobile relative to the vertical wall 32B. In addition, in the present embodiment, the body seal lip 35 extends toward the exterior of the automobile from the part of the hollow seal member 32 closer to the seal wall 32C than the connecting part at which the seal wall 32C is connected to the vertical wall 32B, such that the body seal lip 35 is controlled to bend in the fixed direction. But this should not be construed in a limiting sense. Another possible embodiment is that the body seal lip 35 extends from the connecting part at which the seal wall 32C is connected to the vertical wall 32B (illustration omitted).

Figure 5:
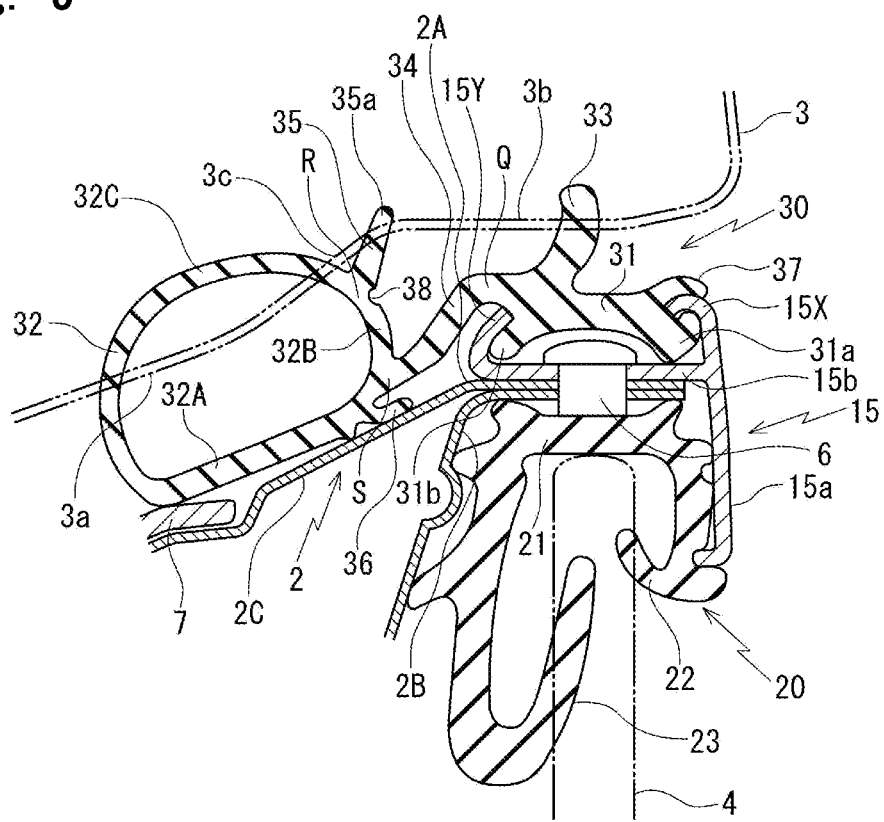
FIG. 5 is the enlarged cross-sectional view of the coupling structure according to still another embodiment of the invention of the weather strip taken along line I-I of FIG. 6.

Still another possible embodiment is, as illustrated in FIG. 5, the seal wall 32C of the hollow seal member 32 is largely rounded in cross section without a part crooked toward the interior of the automobile relative to the vertical wall 32B with the body seal lip 35 provided on the outer-cabin side of the hollow seal member 32.

While in the present embodiment the hollow seal member 32 is designed to touch the garnish 7 on the sash 2, this should not be construed in a limiting sense. Another possible embodiment is that the hollow seal member 32 directly touches the sash 2 without the garnish 7 or a mat instead of the garnish 7. Another possible embodiment is that the hollow seal member 32 laps on the sash 2 or the garnish 7 on the sash 2, in order for the hollow seal member 32 to be pressed against the sash 2 or the garnish 7.

The invention claimed is:

1. A weather strip configured to be coupled to a sash of a door of an automobile, the weather strip comprising:
   a coupling part fixed between a first anchoring part and a second anchoring part provided on an outer periphery of an outer peripheral part of the sash of the door of the automobile, the first anchoring part being closer to an exterior of the automobile than the second anchoring part, and the second anchoring part being closer to an interior of the automobile than the first anchoring part;
   a hollow seal member integrally formed with an inner-cabin side of the coupling part, the hollow seal member being configured to elastically contact a second surface of a door opening edge of a body panel, and the hollow seal member not being fixed to the sash;
   an outer lip integrally formed with an outer-cabin side of the coupling part, the outer lip being configured to make elastic contact with a first surface of the door opening edge of the body panel when the door is in the closed position, the first surface of the door opening edge of the body panel being closer to the exterior of the automobile than the second surface of the door opening edge of the body panel, and the second surface of the door opening edge of the body panel being closer to the interior of the automobile than the first surface of the door opening edge of the body panel;
   a pillar part configured to couple the coupling part with the hollow seal member; and
   a body seal lip provided on the hollow seal member, the body seal lip being configured to make elastic contact with the door opening edge of the body panel when the door is in the closed position,
   wherein a concave part is provided as a channel recessed into an inner side from an outer-cabin side of a base root of the body seal lip, such that the concave part is thinner than at least one other part of the base root of the body seal lip.

2. The weather strip as claimed in claim 1, wherein a cover lip is provided on an outer-cabin side of the coupling part, the cover lip being closer to the interior of the automobile than the first anchoring part, and the cover lip being configured to make elastic contact with the first anchoring part and cover the first anchoring part.

3. The weather strip as claimed in claim 1, wherein the hollow seal member includes:
   a bottom wall which is substantially parallel with a surface of part of the sash of the door;
   a vertical wall which extends in a direction substantially perpendicular to an inner-cabin to outer-cabin direction from a first end of the bottom wall; and
   a seal wall which connects with an end of the vertical wall and a second end of the bottom wall, the seal wall being curved outwardly, the seal wall being formed to bend toward the interior of the automobile relative to the vertical wall, and the second end of the bottom wall being closer to the interior of the automobile than the first end of the bottom wall; and
   wherein the body seal lip extends outwardly toward the exterior of the automobile from a part of the hollow seal member closer to the seal wall than a connecting part at which the seal wall is connected to the vertical wall.

4. A weather strip configured to be coupled to a sash of a door of an automobile, the weather strip comprising:
   a coupling part fixed between a first anchoring part and a second anchoring part provided on an outer periphery of an outer peripheral part of the sash of the door of the automobile, the first anchoring part being closer to an exterior of the automobile than the second anchoring part, and the second anchoring part being closer to an interior of the automobile than the first anchoring part;
   a hollow seal member integrally formed with an inner-cabin side of the coupling part, the hollow seal member being configured to elastically contact a second surface of a door opening edge of a body panel, and the hollow seal member not being fixed to the sash;
   an outer lip integrally formed with an outer-cabin side of the coupling part, the outer lip being configured to make elastic contact with a first surface of the door opening edge of the body panel when the door is in the closed position, the first surface of the door opening edge of the body panel being closer to the exterior of the automobile than the second surface of the door opening edge of the body panel, and the second surface of the door opening edge of the body panel being closer to the interior of the automobile than the first surface of the door opening edge of the body panel;

a pillar part configured to couple the coupling part with the hollow seal member; and a body seal lip provided on the hollow seal member, the body seal lip being configured to make elastic contact with the door opening edge of the body panel when the door is in the closed position, wherein an installation surface seal lip is provided on a lower surface of a bottom wall of the hollow seal member, the installation surface seal lip being configured to make elastic contact with the sash of the door.

5. The weather strip as claimed in claim 4, wherein the hollow seal member includes:

the bottom wall, which is substantially parallel with a surface of part of the sash of the door;

a vertical wall which extends in a direction substantially perpendicular to an inner-cabin to outer-cabin direction from a first end of the bottom wall; and a seal wall which connects with an end of the vertical wall and a second end of the bottom wall, the seal wall being curved outwardly, the seal wall being formed to bend toward the interior of the automobile relative to the vertical wall, and the second end of the bottom wall being closer to the interior of the automobile than the first end of the bottom wall; and wherein the body seal lip extends outwardly toward the exterior of the automobile from a part of the hollow seal member closer to the seal wall than a connecting part at which the seal wall is connected to the vertical wall.

6. A weather strip configured to be coupled to a sash of a door of an automobile, the weather strip comprising:

a coupling part fixed between a first anchoring part and a second anchoring part provided on an outer periphery of an outer peripheral part of the sash of the door of the automobile, the first anchoring part being closer to an exterior of the automobile than the second anchoring part, and the second anchoring part being closer to an interior of the automobile than the first anchoring part;

a hollow seal member integrally formed with an inner-cabin side of the coupling part, the hollow seal member being configured to elastically contact a second surface of a door opening edge of a body panel, and the hollow seal member not being fixed to the sash;

an outer lip integrally formed with an outer-cabin side of the coupling part, the outer lip being configured to make elastic contact with a first surface of the door opening edge of the body panel when the door is in the closed position, the first surface of the door opening edge of the body panel being closer to the exterior of the automobile than the second surface of the door opening edge of the body panel, and the second surface of the door opening edge of the body panel being closer to the interior of the automobile than the first surface of the door opening edge of the body panel;

a pillar part configured to couple the coupling part with the hollow seal member; and a body seal lip provided on the hollow seal member, the body seal lip being configured to make elastic contact with the door opening edge of the body panel when the door is in the closed position, wherein the hollow seal member includes:

a bottom wall which is substantially parallel with a surface of part of the sash of the door;

a vertical wall which extends in a direction substantially perpendicular to an inner-cabin to outer-cabin direction from a first end of the bottom wall; and a seal wall which connects with an end of the vertical wall and a second end of the bottom wall, the seal wall being curved outwardly, the seal wall being formed to bend toward the interior of the automobile relative to the vertical wall, and the second end of the bottom wall being closer to the interior of the automobile than the first end of the bottom wall; and wherein the body seal lip extends outwardly toward the exterior of the automobile from a part of the hollow seal member closer to the seal wall than a connecting part at which the seal wall is connected to the vertical wall.

7. A coupling structure in which a weather strip is coupled to a sash of a door of an automobile, the coupling structure comprising:

(i) the weather strip, which comprises:

a coupling part fixed between a first anchoring part and a second anchoring part provided on an outer periphery of an outer peripheral part of the sash of the door of the automobile, the first anchoring part being closer to an exterior of the automobile than the second anchoring part, and the second anchoring part being closer to an interior of the automobile than the first anchoring part;

a hollow seal member integrally formed with an inner-cabin side of the coupling part, the hollow seal member being configured to elastically contact a second surface of a door opening edge of a body panel, and the hollow seal member not being fixed to the sash;

an outer lip integrally formed with an outer-cabin side of the coupling part, the outer lip being configured to make elastic contact with a first surface of the door opening edge of the body panel when the door is in the closed position, the first surface of the door opening edge of the body panel being closer to the exterior of the automobile than the second surface of the door opening edge of the body panel, and the second surface of the door opening edge of the body panel being closer to the interior of the automobile than the first surface of the door opening edge of the body panel;

a pillar part configured to couple the coupling part with the hollow seal member; and a body seal lip provided on the hollow seal member, the body seal lip being configured to make elastic contact with the door opening edge of the body panel when the door is in the closed position, and a top end of the body seal lip being configured to come into contact with an oblique surface of the door opening edge of the body panel first as the door approaches the closed position;

(ii) the second surface of the door opening edge of the body panel, the second surface being configured to make elastic contact with the hollow seal member of the weather strip when the door is in the closed position;

(iii) the first surface of the door opening edge of the body panel, the first surface being configured to make elastic contact with the outer lip of the weather strip when the door is in the closed position; and (iv) the oblique surface of the door opening edge of the body panel, the oblique surface being configured to connect with the second surface and the first surface, and the oblique surface extending downwards toward the interior of the automobile such that the second surface and the first surface are formed on an uneven base.

8. The coupling structure as claimed in claim 7, wherein the second surface of the door opening edge of the body panel is substantially parallel with a surface of part of the sash when the door is in the closed position, and the hollow seal member is configured to make elastic contact with a connecting part at which the second surface is connected to the oblique surface as well as with the second surface when the door is in the closed position.

\* \* \* \* \*